United States Patent
Vogt et al.

(10) Patent No.: US 12,262,810 B2
(45) Date of Patent: Apr. 1, 2025

(54) ISOLATOR SYSTEM

(71) Applicant: Syntegon Technology GmbH, Waiblingen (DE)

(72) Inventors: Martin Vogt, Stuttgart (DE); Werner Runft, Winnenden (DE); Thomas Franck, Lorch (DE); Walter Böhringer, Remshalden (DE)

(73) Assignee: Syntegon Technology GmbH, Waiblingen (DE)

( * ) Notice: Subject to any disclaimer, the term of this patent is extended or adjusted under 35 U.S.C. 154(b) by 147 days.

(21) Appl. No.: 18/296,429

(22) Filed: Apr. 6, 2023

(65) Prior Publication Data

US 2023/0329431 A1 Oct. 19, 2023

(30) Foreign Application Priority Data

Apr. 14, 2022 (DE) ...................... 10 2022 109 269.0

(51) Int. Cl.
*A47B 47/00* (2006.01)
*A47B 81/00* (2006.01)
(Continued)

(52) U.S. Cl.
CPC .............. *A47B 47/00* (2013.01); *A47B 81/00* (2013.01); *A47B 96/00* (2013.01); *A61J 3/07* (2013.01); *A61J 3/10* (2013.01)

(58) Field of Classification Search
CPC .... A61J 3/07; A61J 3/10; A47B 47/00; A47B 81/00; A47B 96/00; B25J 21/00; B25J 21/02; B01L 1/00
(Continued)

(56) References Cited

U.S. PATENT DOCUMENTS 4,335,712 A * 6/1982 Trexler ................ A61G 10/005
312/1
5,316,733 A * 5/1994 Rune ........................ B25J 21/02
435/809
(Continued)

FOREIGN PATENT DOCUMENTS

DE 102007030789 A1 1/2009
GB 2215347 A 9/1989
(Continued)

OTHER PUBLICATIONS

M. Braun Inertgas-Systeme GMBH, "MB-ACRYL-GLOVEBOX" Inertgas Techology, 2017 (2 pages).
(Continued)

*Primary Examiner* — Daniel J Rohrhoff
(74) *Attorney, Agent, or Firm* — Michael Best & Friedrich LLP

(57) ABSTRACT

An isolator system, having an isolator (10), which has an interior space (22) for processing a substance, the interior space being delimited by a base-side mounting surface (14) for the arrangement of a substance-processing unit (20) and by an isolator cabin (12) with at least one access opening (24), the access opening being assigned at least one closure device for optionally opening up or blocking the access opening. The isolator cabin can be placed or is placed onto the base-side mounting surface, and wherein the isolator system has at least one quick-change interface (34) for exchanging the isolator cabin (12) for an additional cabin with a different protection level and/or for exchanging the closure device for an additional closure device with a different protection level.

19 Claims, 8 Drawing Sheets

(51) Int. Cl.
*A47B 96/00* (2006.01)
*A61J 3/07* (2006.01)
*A61J 3/10* (2006.01)

(58) Field of Classification Search
USPC .................................................. 312/1, 209
See application file for complete search history.

(56) References Cited

U.S. PATENT DOCUMENTS

| | | | | |
|---|---|---|---|---|
| 6,974,197 | B1* | 12/2005 | Henry | B01L 1/50 |
| | | | | 73/431 |
| 10,617,045 | B1* | 4/2020 | Judy | H05K 9/0015 |
| 2010/0275636 | A1* | 11/2010 | Yoshimura | A01N 1/0263 |
| | | | | 901/30 |
| 2012/0299452 | A1* | 11/2012 | Abreu | A41D 19/015 |
| | | | | 312/1 |
| 2012/0311932 | A1* | 12/2012 | Cournoyer | B25J 21/02 |
| | | | | 312/1 |
| 2014/0163326 | A1* | 6/2014 | Forsell | B25J 21/02 |
| | | | | 600/207 |
| 2017/0341241 | A1* | 11/2017 | Granet | G21F 7/047 |
| 2019/0039104 | A1* | 2/2019 | Cordes | B25J 21/02 |
| 2019/0084166 | A1* | 3/2019 | Arizono | B25J 1/08 |
| 2021/0179999 | A1* | 6/2021 | Straw | B01L 1/02 |
| 2022/0279877 | A1* | 9/2022 | Geiser | G21F 7/04 |

FOREIGN PATENT DOCUMENTS

| | | |
|---|---|---|
| JP | 3185604 U | 8/2013 |
| JP | 2015104358 A | 6/2015 |
| WO | 2013012367 A1 | 1/2013 |
| WO | 2021069034 A1 | 4/2021 |

OTHER PUBLICATIONS

Japanese Patent Office Notice of Refusal for Application No. 2023065594 dated Apr. 16, 2024 (8 pages with English machine translation).

European Extended Search Report for European Application No. 23165015.1 mailed Sep. 25, 2023 (Statement of Relevance—9 pages).

* cited by examiner

ISOLATOR SYSTEM

BACKGROUND

The invention relates to an isolator system, having an isolator, which has an interior space for processing a substance, the interior space being delimited by a base-side mounting surface for the arrangement of a substance-processing unit and by an isolator cabin with at least one access opening, the access opening being assigned at least one closure device for optionally opening up or blocking the access opening.

Isolator systems of the abovementioned type are known, for example, from DE 10 2007 030 789 A1 and are used in particular in the pharmaceutical and food industries for the purposes of production, processing and/or packaging of a substance.

In the pharmaceutical and food industries, a multiplicity of different substance-processing units are conventionally used to process a very large number of substances which greatly differ from one another in respect of their properties, for example in respect of their toxicity. The sensitivity with which the substances may be contaminated by contamination from the outside also varies. The same applies to cross contamination, which is to be avoided, between different substances.

In principle, it would be conceivable to provide a dedicated isolator for a certain substance-processing unit and for a certain substance. However, an isolator for its setting up not only takes up a certain footprint, but also requires space in its immediate surroundings for the arrangement of peripheral devices, for a supply of starting substances and removal of products, and for access to the isolator and the interior space thereof by operating and maintenance staff.

Also as a result of the above-described conditions, it is standard practice to use one isolator for different substances and to thoroughly clean the substance-processing unit at least when changing over to a different substance. During this time, the isolator is not available for production and processing or packaging purposes.

Taking this as the starting point, the present invention is based on the object of providing an isolator system which permits an improved utilization rate.

SUMMARY

This object is achieved according to the invention in the case of an isolator system of the type mentioned at the beginning in that the isolator cabin can be placed or is placed onto the base-side mounting surface, and in that the isolator system has at least one quick-change interface for exchanging the isolator cabin for an additional cabin with a different protection level and/or for exchanging the closure device for an additional closure device with a different protection level.

The isolator system according to the invention makes it possible to be able to change a protection level of the isolator system by exchanging an isolator cabin for an additional cabin and/or by exchanging a closure device for an additional closure device. Such a protection level corresponds to classifications of an isolator system that are specified in levels from 1 (low protective effect) to 6 (high protective effect), specifically as an OEB value ("Occupational Exposure Band") or as an OEL value ("Occupational Exposure Limit"). The OEB value designates the toxicology of the pure substance to be processed by means of the substance-processing unit, and the OEL value the average concentration loading on the staff member during an eight hour shift. If, therefore, a certain OEB value and a certain OEL value are predetermined for processing a certain substance, the isolator system has to have a protection level which is at least of such a level.

To change the protection level, it is possible, for example, to exchange the entire isolator cabin for an additional cabin with a different protection level. In this case, the base-side mounting surface remains as a stationary component of the isolator system, with it being possible to retain a substance-processing unit arranged on the mounting surface or to exchange it for an identical or different substance-processing unit. It is possible for the isolator cabin to have a higher protection level than the additional cabin.

The invention is based on the concept that an isolator is conventionally designed and configured for a very specific and unchangeable protection level. However, the isolators of higher protection levels (for example protection level 5) have closure devices which make access to the interior space of the isolator cabin more difficult than is the case for isolator cabins of lower protection levels (for example protection level 3 or 4).

In order to change the protection level, it is also possible to exchange a closure device for an additional closure device, in particular with the other components of the isolator cabin being retained. In this way, for the event of conversion to a lower protection level, access to the interior space of the isolator cabin can be simplified by a closure device assigned to a higher protection level being exchanged for an additional closure device which is assigned to a lower protection level. Conversely, conversion from a lower protection level to a higher protection level is also possible.

For the isolator cabin, it is preferred that said isolator cabin in a starting state comprises peripherals and accessories of a higher protection level, for example protection level 5, for example a unit for generating a vacuum in the interior space of the isolator cabin and/or a cleaning unit for cleaning the interior space with a cleaning fluid, for example hydrogen peroxide. For the event of conversion of an isolator cabin to a lower protection level, the peripherals and accessories of the higher protection level continue to be maintained, but are not used for a use phase of the isolator cabin with a lower protection level. This approach is based on the concept that it would be very much more complicated, if not virtually impossible, to convert isolator cabins which are configured for a low protection level (e.g. protection level 3) rapidly and simply to a higher protection level.

Overall, the isolator system according to the invention makes it possible to better and more flexibly utilize isolators in a production environment and to simplify use of the isolators for the staff.

It is preferred that the quick-change interface has a stationary interface section which interacts, in particular in a form-fitting manner, with a mobile interface section or is releasably connected to a mobile interface section.

In a particularly simple refinement, the quick-change interface is provided by a seal which is effective between the mounting surface and the isolator cabin and is preferably arranged in a fixed position on the mounting surface. In this case, a lower boundary of the isolator cabin rests on said seal and thereby closes the interior space of the isolator. An exchange can take place by simply lifting off the isolator cabin from the seal; subsequently, the isolator cabin can be exchanged for an additional cabin with a different protection level.

To increase the stability of the quick-change interface, it is preferred if the interface sections thereof interact in a form-fitting manner with one another. Such a form fit can be produced, for example, by in particular manually actuated mechanical elements, for example by rotary handles, knurled screws, toggle levers or quick-release levers.

In a preferred embodiment, provision is made that the stationary interface section is driven by electric motor or pneumatically. This permits automated production of a form fit with a mobile interface section, for example using a central controller of the isolator.

To further simplify an exchange of the isolator cabin or of the closure device, it is preferred if the quick-change interface has at least one stationary contact section for electrically contacting a mobile contact section. In this way, when fitting the quick-change interface, at the same time an electrical connection can also be produced between a stationary and a mobile interface section without separate installation processes being required for this purpose.

In a corresponding manner, it is possible that the quick-change interface has at least one stationary fluid supply section for the fluid supply of a mobile fluid line section. In this way, when fitting the quick-change interface, at the same time a fluid connection can also be produced between a stationary and a mobile interface section without separate installation processes being required for this purpose. The fluid supply can be, for example, a compressed air supply or a negative pressure supply.

The mounting surface is preferably arranged on a stand. In this case, a stationary interface section of the quick-change interface is preferably arranged on the mounting surface and/or on the stand. This also simplifies a connection of a stationary interface section driven by electric motor.

It is preferred that the mounting surface has a sealing section which is closed on the circumferential side and optionally interacts with a mating section, which extends in a closed manner on the circumferential side, of the isolator cabin or of the additional cabin. This permits simple production of sealing of a lower delimitation of the interior space of the isolator irrespective of whether the sealing section also forms a quick-change interface.

As explained above, it is preferred that the closure device has a higher protection level than the additional closure device. It should be taken into consideration here that closure devices of higher protection levels may be heavier and take up more space than additional closure devices with lower protection levels. By taking into consideration a closure device with a higher protection level for a starting state of an isolator cabin, it is therefore ensured in a simple manner that the isolator cabin can receive closure devices of different protection levels.

In particular, it is preferred that the closure device and the additional closure device are each arranged on a support which forms or has a mobile interface section of the quick-change interface. Such a support can be, for example, a support plate which has been or is connected to a housing of the isolator cabin or to a door of the isolator cabin. It is also possible for the support itself to form a door of the isolator cabin.

A preferred closure device has fluid-permeable handling protection. This can be, for example, a mesh which permits fluid to flow out of the surroundings into the interior space of the isolator cabin, but prevents manual intervention in the interior space. It is possible here for the handling protection to be mounted movably (in particular displaceably or pivotably) on a support between a use position, in which intervention in the interior space is prevented, and a release position, in which intervention in the interior space is enabled.

Preferred additional closure devices have a glove port and/or a fluid-impermeable covering. The glove port permits fluid-tight intervention in the interior space of the isolator cabin; the fluid-impermeable covering prevents fluid exchange of the interior space of the isolator cabin with the surroundings thereof and is optionally also effective as mechanical protection for the glove port.

A further possibility for adaptation to different protection levels consists in that the isolator cabin and/or the additional cabin has a suction region with a fluid opening which is optionally connected to a suction device for sucking off fluid from the interior space or to a fluid barrier which prevents fluid from escaping out of the interior space.

The substance-processing unit is in particular a capsule-filling machine or a tablet press. Such substance-processing units serve for processing substances of different toxicity and different sensitivity to contamination from the outside.

The invention furthermore relates to a method for providing an isolator using an above-described isolator system, an isolator with a first protection level being provided, and wherein an isolator with a different protection level is provided by exchanging and/or removing components of the isolator. In particular, a change from protection level 5 to protection level 4 or a change from protection level 4 to protection level 3 is possible. A change from a lower to a higher protection level is also possible.

BRIEF DESCRIPTION OF THE DRAWINGS

Further features and advantages of the invention are the subject matter of the description below and the graphical illustration of preferred exemplary embodiments.

In the drawing

DETAILED DESCRIPTION

Figure 1:
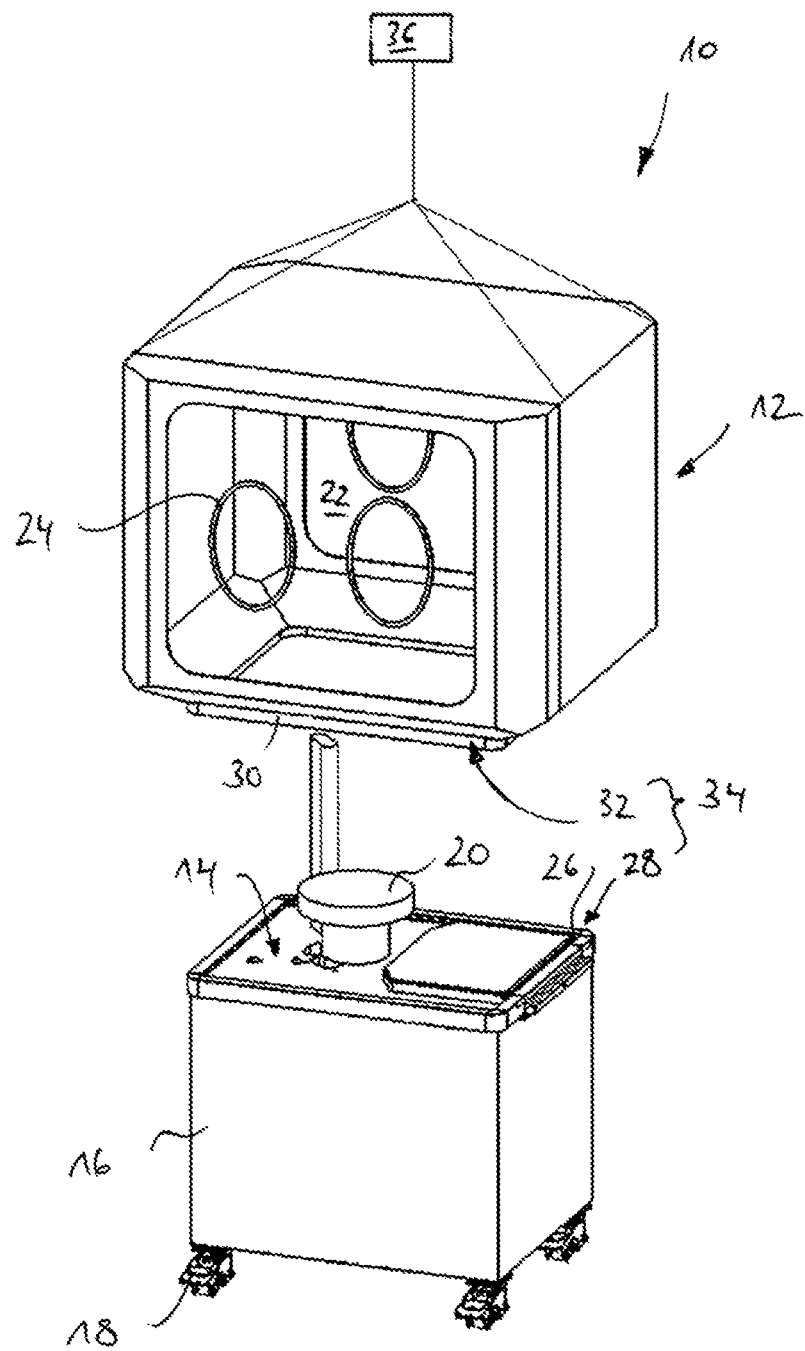
FIG. 1 shows a perspective view of a first embodiment of an isolator.
Figure 2:
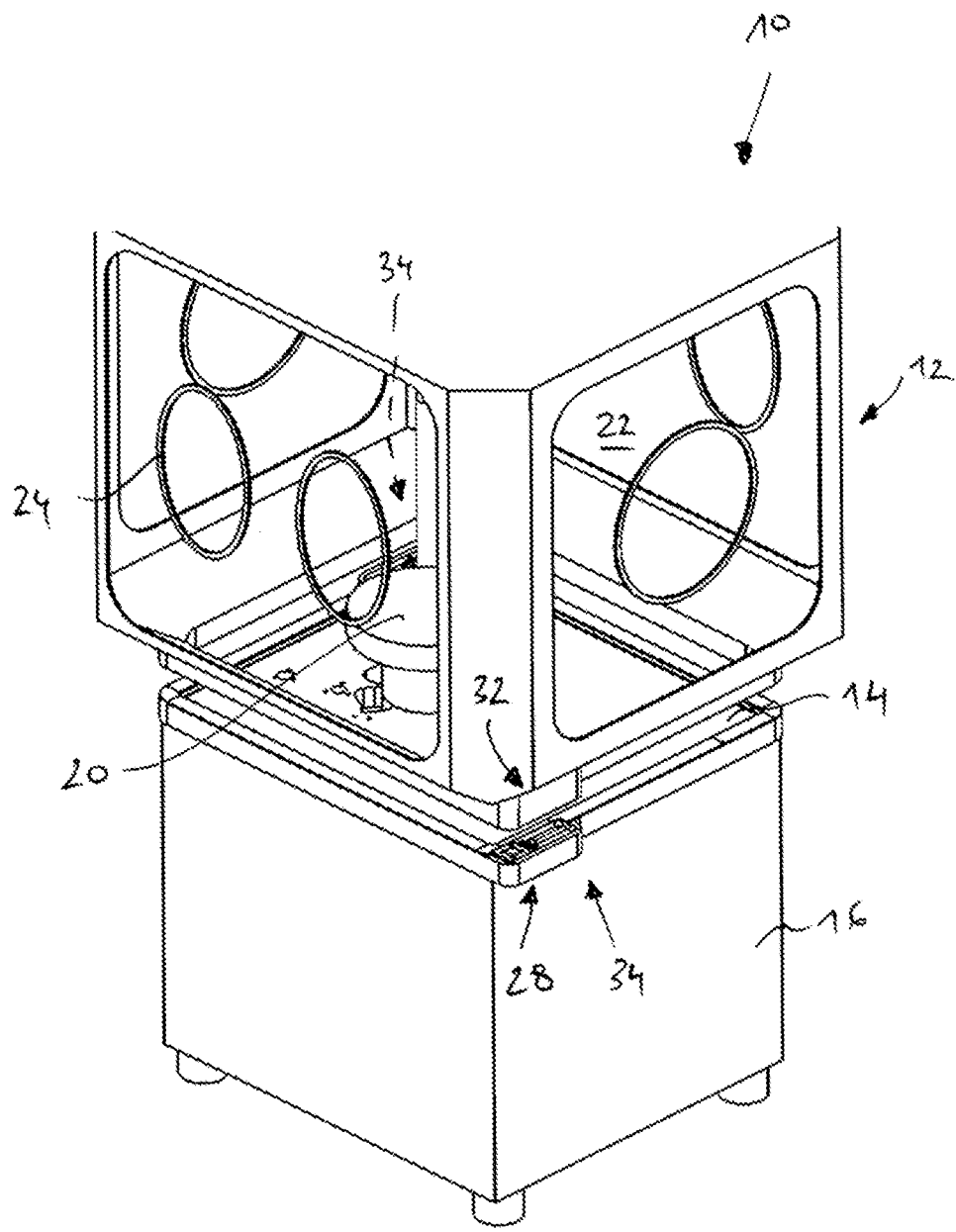
FIG. 2 shows a perspective view of a further embodiment of an isolator.
Figure 3:
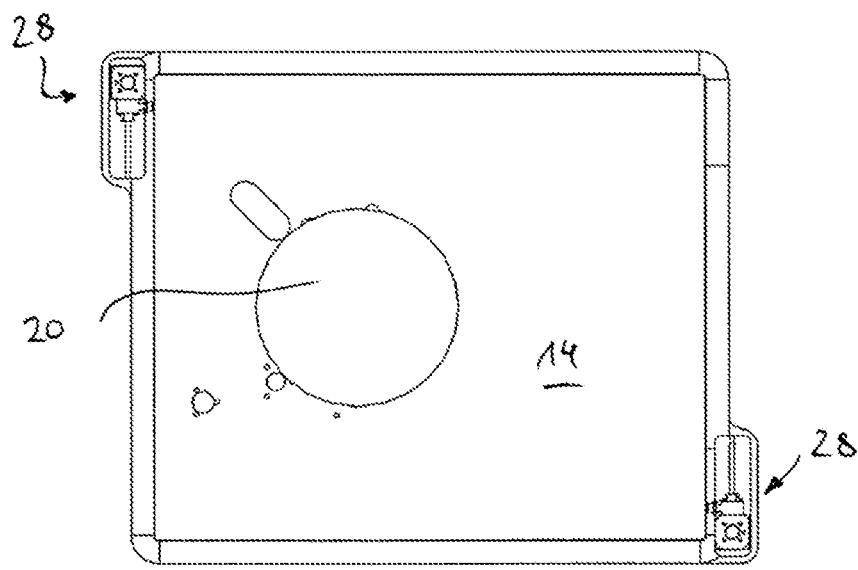
FIG. 3 shows a top view of a mounting plate of the isolator according to FIG. 2.

An embodiment of an isolator is illustrated in FIG. 1 and denoted as a whole by reference sign 10. The isolator 10 comprises an isolator cabin 12 which can be placed or is placed onto a base-side mounting surface 14. The mounting surface 14 is connected to a stand 16, which is fixed in position or else is movable via castors 18 or a travel drive.

The mounting surface 14 serves for the arrangement for the substance-processing unit 20, which is in particular a capsule-filling machine or a tablet press.

When the isolator cabin 12 and the base-side mounting surface 14 are connected, the mounting surface 14 and the isolator cabin 12 together delimit an interior space 22 in which the substance-processing unit 20 is arranged.

The mounting surface 14 has a sealing section 26 which extends in a closed manner on the circumferential side and forms a stationary interface section 28.

A lower boundary and delimitation of the isolator cabin 12 has a sealing web 30 which extends in a closed manner on the circumferential side and forms a mobile interface section 32. The interface sections 28, 32 together form a quick-change interface 34.

In order to install the isolator cabin 12 on the mounting surface 14, a lifting unit 36 is provided which lowers the isolator cabin 12 from a state lifted off from the mounting surface in the direction of the mounting surface 14 until the sealing web 30 strikes against the sealing section 26 and, because of the weight of the isolator cabin 12, presses in said sealing section such that a fluid-tight connection is produced between the mounting surface 14 and the isolator cabin 12.

The isolator cabin 12 comprises a closure device which is arranged on the access opening 24 but is not illustrated in FIG. 1. Such closure devices will be described below with reference to FIGS. 6 to 17.

The isolator 10 illustrated in FIG. 1 is part of an isolator system which, in addition to the isolator cabin 12 illustrated in the drawing, comprises a further additional cabin, not illustrated in the drawing. The isolator cabin 12 and the additional cabin are equipped in the region of their respective access openings 24 with closure devices and additional closure devices, respectively, which are assigned to different protection levels. In this way, by easy changing of the isolator cabin 12 for an additional cabin, an isolator 10 with a changed protection level can be provided.

FIGS. 2 to 5 illustrate a further embodiment of an isolator 10 which has a design comparable to the isolator 10 according to FIG. 1 but differs from the embodiment according to FIG. 1 in respect of the configuration of the quick-change interface 34. The quick-change interface 34 of the embodiment according to FIGS. 2 to 5 is provided at least singly, preferably twice, cf. FIGS. 2 and 3. At least one stationary interface section 28 is arranged in an edge region or to the side of the mounting surface 14. The at least one stationary interface section 28 has a receiving element 36 for the form-fitting receiving and locking by electric motor of a form-fitting element 38 of the mobile interface section 32 of the isolator cabin 12.

Figure 4:
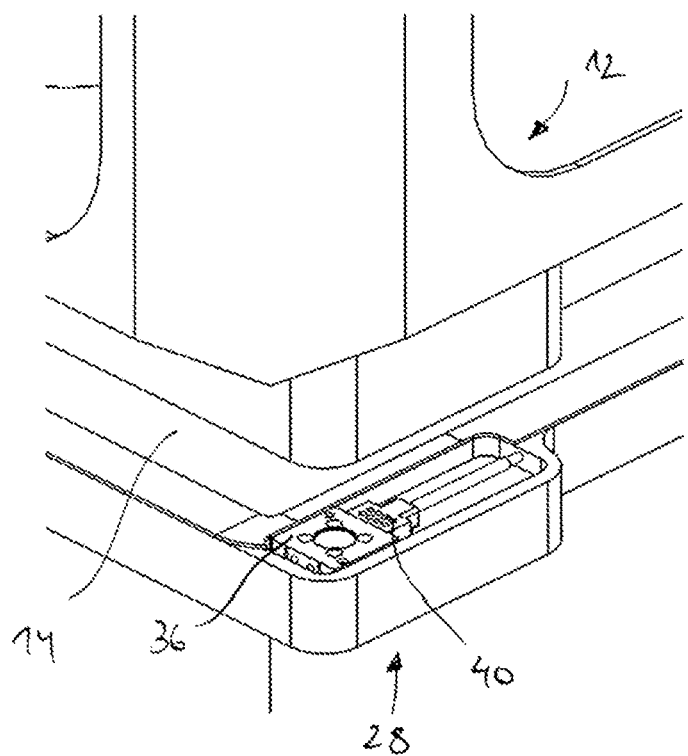
FIG. 4 shows a perspective view of a detail of the isolator according to FIG. 2 from a top perspective.
Figure 5:
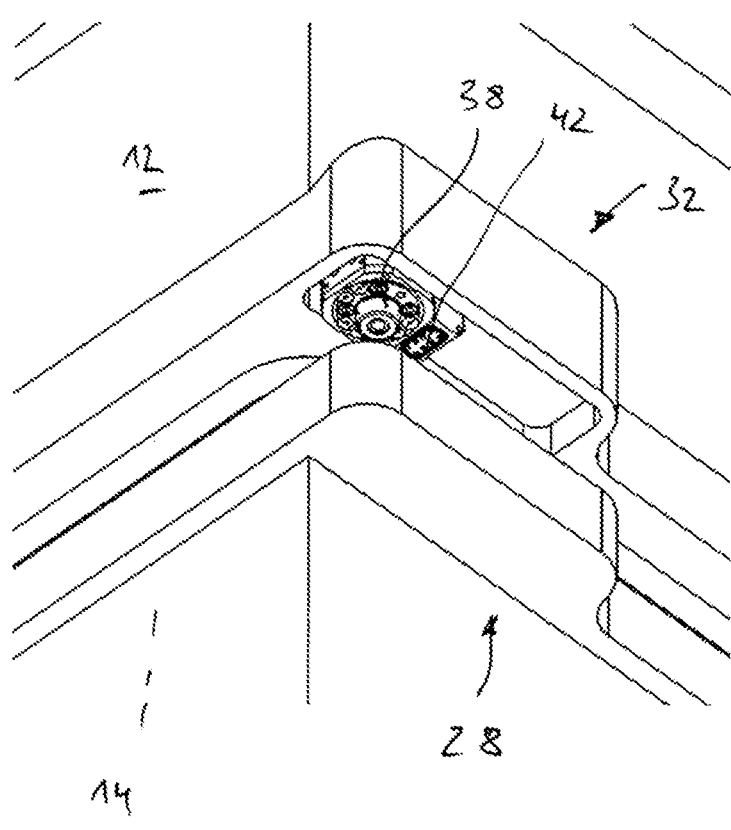
FIG. 5 shows a view corresponding to FIG. 4 from a bottom perspective.

The stationary interface section 28 furthermore has a stationary contact section 40 for electrically contacting a mobile contact section 42 of the mobile interface section 32, cf. FIGS. 4 and 5.

The isolator 10 according to FIGS. 2 to 5 is also part of an isolator system which comprises an additional cabin, not illustrated, in addition to the isolator cabin 12 which is illustrated, with the respective access openings 24 of the isolator cabin 12 and of the additional cabin being provided with closure devices and additional closure devices, respectively, of different protection levels.

Figure 6:
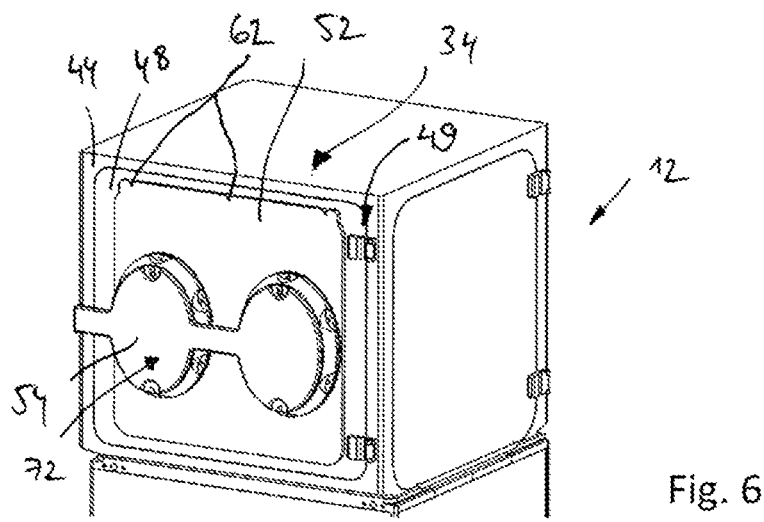
FIG. 6 shows a perspective front view of an embodiment of an isolator cabin with an additional closure device.
Figure 7:
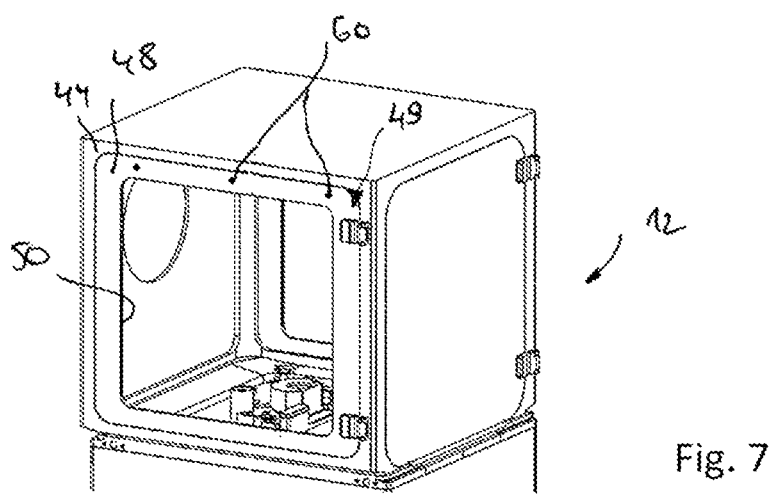
FIG. 7 shows a view corresponding to FIG. 6 without the additional closure device.
Figure 8:
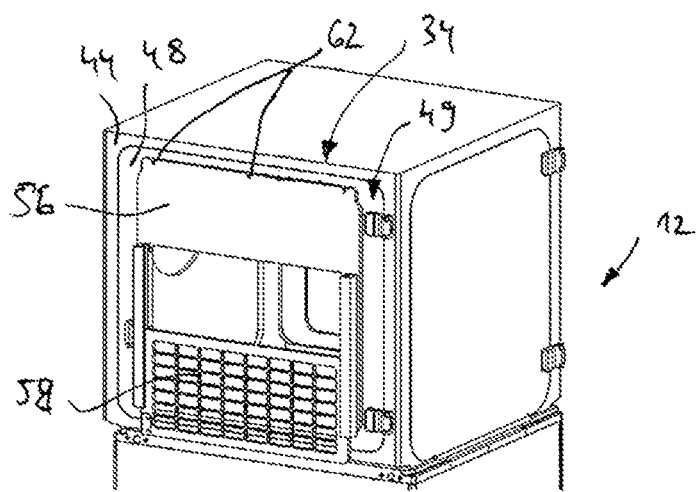
FIG. 8 shows a view corresponding to FIG. 7 with a closure device.
Figure 9:
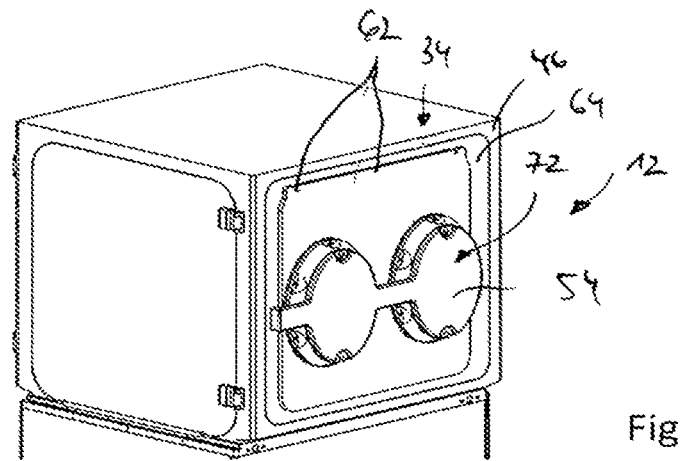
FIG. 9 shows a perspective rear view of the isolator cabin according to FIG. 6 with a further additional closure device.
Figure 10:
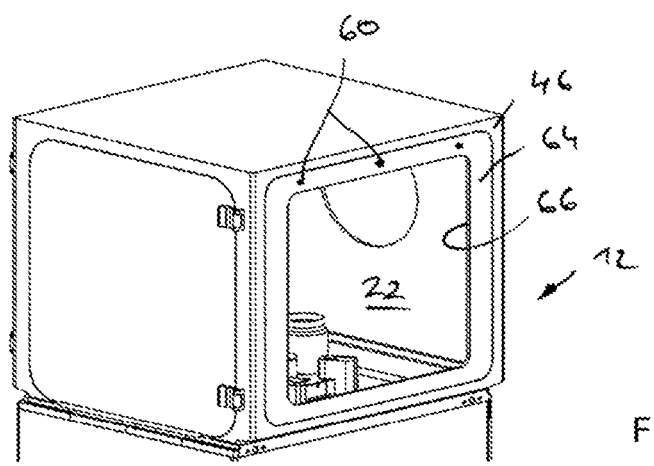
FIG. 10 shows a view corresponding to FIG. 9 without the further additional closure device.
Figure 11:
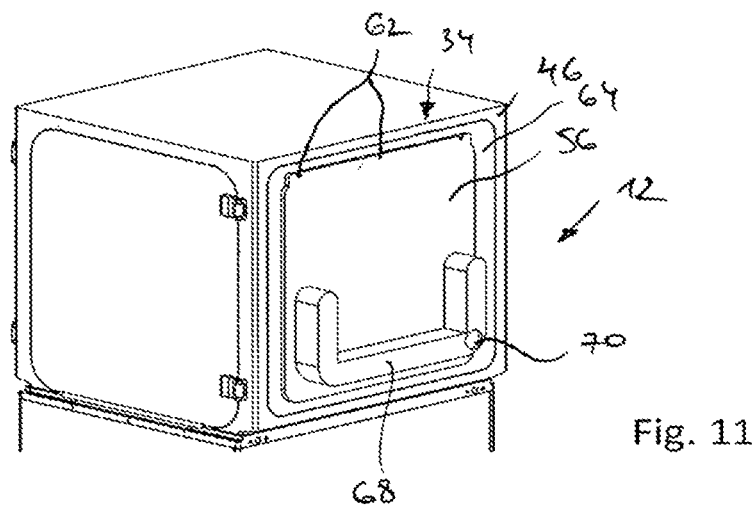
FIG. 11 shows a view corresponding to FIG. 10 with a further closure device.

FIGS. 6 to 11 illustrate an embodiment of an isolator cabin 12 of an isolator 10, FIGS. 6 to 8 showing front-side perspectives and FIGS. 9 to 11 rear perspectives.

The isolator cabin 12 has a front wall 44 and a rear wall 46. A door 48 is mounted pivotably on the front wall 44 by means of hinges 49, for example. The door 48 has a door opening 50 which is integrated in the door, cf. FIG. 7. The door opening 50 is optionally closable by a support 52 on which a closure device 54 of a first protection class is arranged and in particular is fastened there, cf. FIG. 6, or by a support 56 on which an additional closure device 56 of a protection class different from the first protection class is arranged and in particular is fastened there, cf. FIG. 8.

The supports 52, 56 are each connectable to the isolator cabin 12 via a quick-change interface 34. The quick-change interface 34 is designed as a releasable connection, for example in the form of a screw connection. For this purpose, the door 48 has a stationary interface section 60 in the form of at least one screw receptacle (cf. FIG. 7). The supports 52, 56 have a mobile interface section 62 in the form of at least one screw passage region for the passage of one screw each (not illustrated), cf. FIGS. 6 and 8. The mobile interface sections 62 of the different supports 52 and 56 are optionally and interchangeably connected or connectable to the stationary interface section 60.

When the arrangement of one of the supports 52, 56 is omitted, an isolator cabin 12 with a comparatively lower protection class is provided, cf. FIG. 7, with an open door opening 50 of the door 48.

Optionally, a boundary of the door opening 50 of the door 48 forms a stationary interface section 60 which interacts with a mobile interface section 62 in each case (for example with undercutting rotary hooks in the engagement position) of the support 52 or 56.

In the region of the rear wall 46, the isolator cabin 12 has a frame 64 which borders a frame opening 66, cf. FIG. 10. The frame 64 can be fixedly connected to the rear wall 46 or can be designed as, for example, a pivotable door, corresponding to the door 48 on the front side 44 of the isolator cabin 12. The frame opening 66 can be closed via a quick-change interface 34, for example of the type described above with reference to FIGS. 6 to 8. For example, a support 52 with a closure device 54 can be used, cf. FIG. 9. A support 56 which is provided with a suction region 68 can optionally also be used, cf. FIG. 11.

The suction region 68 communicates with the interior space 22 of the isolator cabin 12 and feeds air out of the interior space 22 of the isolator cabin 12 via the suction region 68 to a fluid opening 70 which is optionally connectable or connected to a suction device (not illustrated).

The two closure devices 54, compare FIGS. 6 and 9, have coverings 72 which are fluid-impermeable. The closure devices 54 can have glove ports which can be covered by the coverings 72.

The configuration of the isolator cabin 12 according to FIGS. 6 and 9 is assigned to a first protection level, in particular to protection level 5. The configuration of the isolator cabin 12 according to FIGS. 8 and 11 is assigned to a comparatively lower protection level, for example protection level 3 (fluid opening 70 open) or protection level 4 (fluid opening 70 connected to an external suction device).

An embodiment of an isolator cabin 12 described below with reference to FIGS. 12 to 17 has a design comparable to the isolator cabin 12 according to FIGS. 6 to 11. In the embodiment according to FIGS. 12 to 17, a door 48 is arranged on the front wall 44, said door being openable and closable by means of hinges 49 and forming a support for the closure device 54 (cf. FIG. 12), for open access openings 24 (cf. FIG. 13) or for an additional closure device 58 (cf. FIG. 14).

The quick-change interface 34 is designed as a releasable connection, for example in the form of a screw connection. For this purpose, the door 48 has a stationary interface section 60 in the form of at least one screw receptacle (cf. FIG. 13). The closure device 54 (cf. FIG. 12) and the additional closure device 58 (cf. FIG. 14) each have a mobile interface section 62 in the form of at least one screw, cf. FIGS. 12 and 14. The mobile interface sections 62 of the two closure devices 54 and 58 are optionally and interchangeably connected or connectable to the stationary interface section 60.

Figure 13:
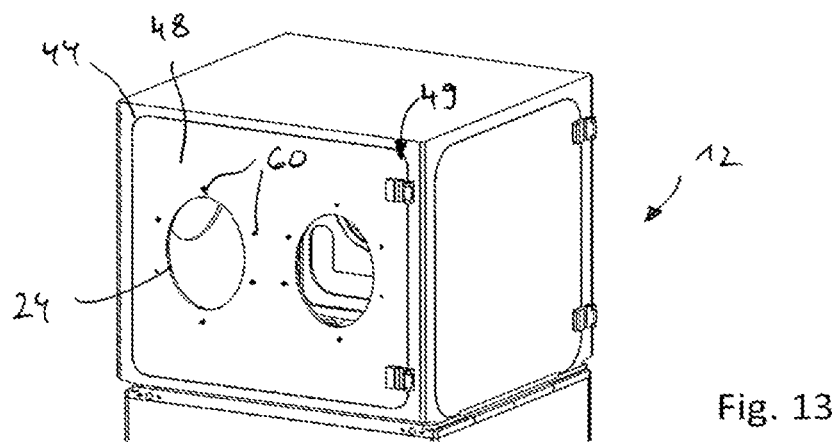
FIG. 13 shows a view corresponding to FIG. 12 without the additional closure device.

When the arrangement of a closure device 54, 58 is omitted, an isolator cabin 12 with a comparatively lower protection class is provided, cf. FIG. 13, with an open access opening 24 of the door 48.

The isolator cabin 12 according to FIGS. 12 to 17 has, on its rear wall 46, a panel 74 which closes the rear wall in sections and on which optionally a closure device 54 (or a glove port), optionally an additional panel 76 (cf. FIG. 15), or a suction region 68 and an additional closure device 58 in the form of an additional door 78 (cf. FIG. 17) are arranged. The additional door 78 can be coupled via a hinge 82 and held, for example magnetically, in a closed door position.

Figure 16:
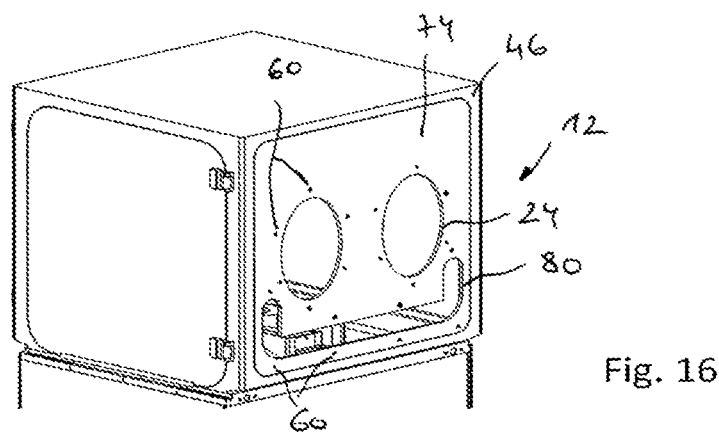
FIG. 16 shows a view corresponding to FIG. 15 without the further additional closure device.

It is possible for the panel 74 to be free from further components, and, for example, to have an open access opening 24 and optionally an open additional opening 80, cf. FIG. 16.

The panel 74 forms a support which is fixedly connected to the rear wall 46 or, alternatively thereto, can be designed as, for example, a pivotable door, corresponding to the door 48 on the front side 44 of the isolator cabin 12.

The quick-change interface 34 is designed as a releasable connection, for example in the form of a screw connection. For this purpose, the panel 74 (or a door 48) has a stationary interface section 60 in the form of at least one screw receptacle (cf. FIG. 16). The closure device 54 and the additional panel 76 (cf. FIG. 15) and the suction region 68 and the additional door 78 (cf. FIG. 17) each have a mobile interface section 62 in the form of at least one screw, cf. FIGS. 15 and 17. These mobile interface sections 62 are optionally and interchangeably connected or connectable to the stationary interface section 60.

When the arrangement of a closure device 54, 58 is omitted, an isolator cabin 12 with a comparatively lower protection class is provided, cf. FIG. 16, with an open access opening 24 in the panel 74 or a door 48, optionally also with the open additional opening 80.

Figure 12:
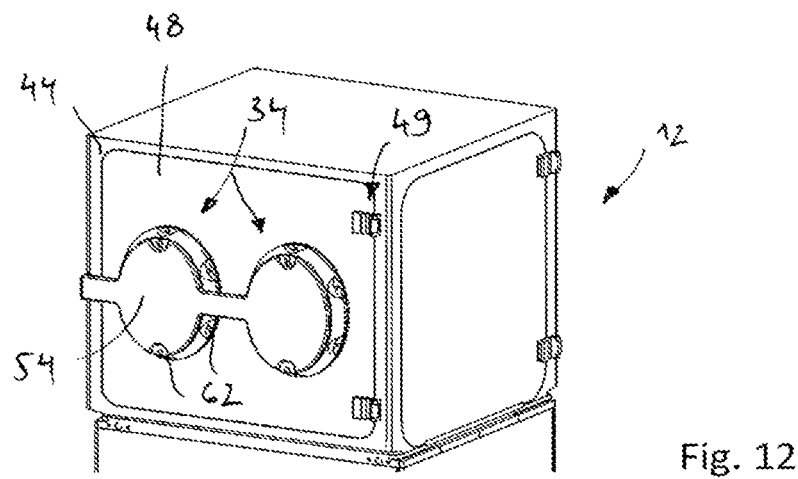
FIG. 12 shows a perspective front view of a further embodiment of an isolator cabin with an additional closure device arranged on a door.
Figure 14:
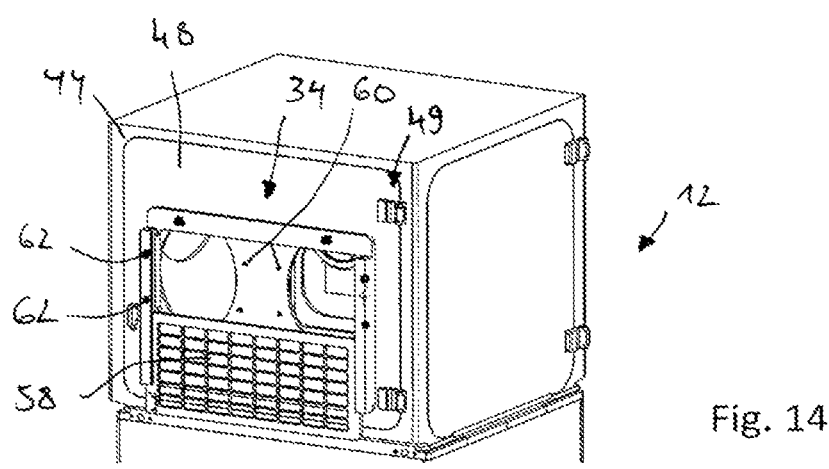
FIG. 14 shows a view corresponding to FIG. 13 with a closure device.
Figure 15:
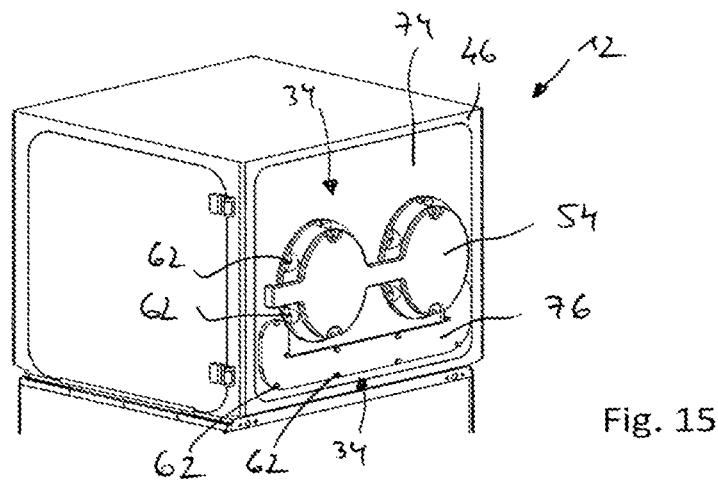
FIG. 15 shows a perspective rear view of the isolator cabin according to FIG. 12 with a further additional closure device arranged on a door.
Figure 17:
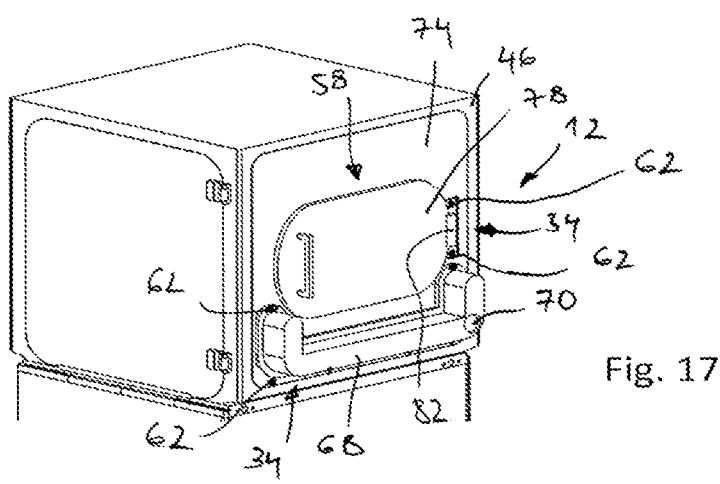
FIG. 17 shows a view corresponding to FIG. 16 with a further closure device.

As explained above with reference to FIGS. 6 to 11, the isolator cabin 12 according to FIGS. 12 and 15 is assigned a higher protection level than the isolator cabin 12 according to FIGS. 14 and 17.

What is claimed is:

1. An isolator system, having an isolator (10), the isolator (10) comprising:
   a stand (16),
   a base-side mounting surface (14),
   an isolator cabin (12) with at least one access opening (24), and
   an additional cabin with a different protection level than the isolator cabin (12),
   wherein the isolator (10) further includes an interior space (22) for processing a substance, the interior space (22) being delimited by the base-side mounting surface (14) and by the isolator cabin (12),
   wherein the base-side mounting surface (14) is arranged on the stand (16),
   wherein a substance-processing unit (20) is arranged on the base-side mounting surface (14),
   wherein the at least one access opening (24) is assigned at least one closure device (54) for opening up or blocking the access opening,
   wherein the isolator cabin (12) and the additional cabin are configured to be alternatively placed onto the base-side mounting surface (14),
   wherein the isolator (10) is configured such that the base-side mounting surface (14) and the stand (16) remain coupled when the isolator cabin (12) is exchanged for the additional isolator cabin, and
   wherein the isolator system has at least one quick-change interface (34) for exchanging the isolator cabin (12) with the additional cabin.

2. The isolator system according to claim 1, wherein the quick-change interface (34) has a stationary interface section (28, 60) which interacts with a mobile interface section (32, 62) or is releasably connected to a mobile interface section (32, 62).

3. The isolator system according to claim 2, wherein the stationary interface section (28) is driven by electric motor or pneumatically.

4. The isolator system according to claim 1, wherein the quick-change interface (34) has at least one stationary contact section (40) for electrically contacting a mobile contact section (42).

5. The isolator system according to claim 1, wherein the quick-change interface (34) has at least one stationary fluid supply section for a fluid supply of a mobile fluid line section.

6. The isolator system according to claim 1, wherein the mounting surface (14) has a sealing section (26) which extends in a closed manner on a circumferential side and optionally interacts with a mating section (30), which extends in a closed manner on the circumferential side, of the isolator cabin (12) or of the additional cabin.

7. The isolator system according to claim 1, wherein the isolator cabin (12) and/or the additional cabin has a suction region (68) with a fluid opening (70) which is optionally connected to a suction device for sucking off fluid from the interior space (22) or to a fluid barrier which prevents fluid from escaping out of the interior space.

8. The isolator system according to claim 1, wherein the substance-processing unit (20) is a capsule-filling machine or a tablet press.

9. A method for preparing an isolator using an isolator system according to claim 1, an isolator (10) with a first protection level being provided, wherein an isolator with a different protection level is provided by exchanging and/or removing components of the isolator (10).

10. An isolator system, having an isolator (10), which has an interior space (22) for processing a substance, the interior space (22) being delimited by a base-side mounting surface (14) for the arrangement of a substance-processing unit (20) and by an isolator cabin (12) with at least one access opening (24), the access opening (24) being assigned at least one closure device (54) for optionally opening up or blocking the access opening, wherein the isolator cabin (12) can be placed or is placed onto the base-side mounting surface (14), and the isolator system has at least one quick-change interface (34) for exchanging the closure device (54) for an additional closure device (58) with a different protection level, wherein the closure device (54) and the additional closure device (58) are each arranged on a support (52, 56) which forms or has a mobile interface section (62) of the quick-change interface (34).

11. The isolator system according to claim 10, wherein the quick-change interface (34) has a stationary interface section (28, 60) which interacts with a mobile interface section (32, 62) or is releasably connected to a mobile interface section (32, 62).

12. The isolator system according to claim 11, wherein the stationary interface section (28) is driven by electric motor or pneumatically.

13. The isolator system according to claim 10, wherein the quick-change interface (34) has at least one stationary contact section (40) for electrically contacting a mobile contact section (42).

14. The isolator system according to claim 10, wherein the quick-change interface (34) has at least one stationary fluid supply section for a fluid supply of a mobile fluid line section.

15. The isolator system according to claim 10, wherein the closure device (54) has a higher protection level than the additional closure device (58).

16. The isolator system according to claim 10, wherein the additional closure device (58) has fluid-permeable handling protection.

17. The isolator system according to claim 10, wherein the closure device (54) has a glove port and/or a fluid-impermeable covering (72).

18. The isolator system according to claim 10, wherein the substance-processing unit (20) is a capsule-filling machine or a tablet press.

19. A method for preparing an isolator using an isolator system according to claim 10, an isolator (10) with a first protection level being provided, wherein an isolator with a different protection level is provided by exchanging and/or removing components of the isolator (10).

* * * * *